(12) United States Patent
DeVoe

(10) Patent No.: US 7,727,392 B2
(45) Date of Patent: Jun. 1, 2010

(54) SYSTEM FOR CONVERTING KINETIC ENERGY FROM BROWNIAN MOTION OF GASES OR LIQUIDS TO USEFUL ENERGY, FORCE AND WORK

(75) Inventor: Irving W. DeVoe, Marblehead, MA (US)

(73) Assignee: Effusion Dynamics LLC, Boston, MA (US)

( * ) Notice: Subject to any disclaimer, the term of this patent is extended or adjusted under 35 U.S.C. 154(b) by 69 days.

(21) Appl. No.: 12/209,421

(22) Filed: Sep. 12, 2008

(65) Prior Publication Data

US 2009/0000288 A1 Jan. 1, 2009

Related U.S. Application Data

(62) Division of application No. 10/626,209, filed on Jul. 24, 2003.

(51) Int. Cl.
*B01D 61/00* (2006.01)
*B01D 63/00* (2006.01)

(52) U.S. Cl. ............ 210/257.2; 210/321.6; 210/321.72; 210/652; 210/258

(58) Field of Classification Search ................. None
See application file for complete search history.

(56) References Cited

U.S. PATENT DOCUMENTS

| | | | |
|---|---|---|---|
| 3,906,250 A | 9/1975 | Loeb |
| 3,978,344 A | 8/1976 | Jellinek |
| 4,177,146 A | 12/1979 | Popper |
| 4,193,267 A | 3/1980 | Loeb |
| 4,288,326 A | 9/1981 | Keefer |
| 4,530,963 A | 7/1985 | DeVoe |
| 4,585,559 A | 4/1986 | DeVoe |
| 4,626,416 A | 12/1986 | DeVoe |
| 4,776,171 A | 10/1988 | Perry |
| 5,066,371 A | 11/1991 | DeVoe |
| 5,089,123 A | 2/1992 | DeVoe |
| 5,173,179 A | 12/1992 | DeVoe |
| 5,306,428 A | 4/1994 | Tonner |
| 5,755,102 A | 5/1998 | Assaf |
| 6,017,200 A | 1/2000 | Childs |
| 6,224,572 B1 | 5/2001 | Jacobsen |
| 6,313,545 B1 | 11/2001 | Finley |
| 6,447,259 B2 | 9/2002 | Moore |
| 6,491,813 B2 | 12/2002 | Verde |

FOREIGN PATENT DOCUMENTS

| | | |
|---|---|---|
| DE | 3121968 A1 | 1/1983 |
| EP | 1050338 A2 | 11/2000 |
| JP | 5805364 A | 3/1983 |
| WO | 02/062708 A1 | 8/2002 |

OTHER PUBLICATIONS

Ravillous, K. Salt Solution: Cheap power from the river's mouth, Feb. 25, 2009. Downloaded from www.newscientist.com on Mar. 19, 2009.

*Primary Examiner*—Krishnan S Menon
(74) *Attorney, Agent, or Firm*—Burns & Levinson LLP; Jacob N. Erlich

(57) ABSTRACT

A system for producing energy includes a solvent chamber, a pressure chamber and a semi-permeable barrier separating the solvent chamber from the pressure chamber. The solvent chamber for holds a solvent, and the pressure chamber hold a solute solution comprising a solute dissolved in a solvent. The semi-permeable barrier is permeable to solvent molecules and impermeable to solute molecules. Solvent molecules effuse across the semi-permeable barrier into the solute solution of the closed pressure chamber to increase the pressure of the pressure chamber, thereby generating energy in the form of hydrostatic pressure. A conversion device may convert the increased pressure in the pressure chamber to energy. The solute solution may be expelled and recycled after use.

35 Claims, 9 Drawing Sheets

| | AlCl3.6H2O | AlCl3 | Sucrose | NaCl | LiCl | LiCl | FeCl3H2O | FeCl3 | |
|---|---|---|---|---|---|---|---|---|---|
| | H2O | Methanol | H2O | H2O | H2O | Methanol | H2O | Methanol | |
| Density solvent | 1.000 | 0.791 | 1.000 | 1.000 | 1.000 | 0.791 | 1.000 | 0.791 | |
| Solvent molecular weight | 18.0 | 32.0 | 18.0 | 18.0 | 18.0 | 32.0 | 18.0 | 32.0 | |
| Moles solvent in 1 Kg | 55.6 | 31.2 | 55.6 | 55.6 | 55.6 | 31.2 | 55.6 | 31.3 | moles |
| Concentration of pure solvent | 55.6 | 24.7 | 55.6 | 55.6 | 55.6 | 24.7 | 55.6 | 24.7 | mol/L |
| Heat capacity, Cp | 4.18 | 2.00 | 4.18 | 4.18 | 4.18 | 2.00 | 4.18 | 2.00 | J K⁻¹ mol⁻¹ |
| Heat capacity, Cp | 1.00 | 0.48 | 1.00 | 1.00 | 1.00 | 0.48 | 1.00 | 0.48 | cal K⁻¹ mol⁻¹ |
| Energy spent to raise blowdown to 25° C | 5.80 | 1.24 | 5.80 | 5.80 | 5.80 | 1.24 | 5.80 | 1.24 | kJ L⁻¹ |
| Energy spent to vaporize at 25°C at vapor pressure | 40.65 | 35.20 | 40.65 | 40.65 | 40.65 | 35.20 | 40.65 | 35.20 | kJ mol⁻¹ |
| Energy spent to vaporize at 25°C at vapor pressure | 0.63 | 0.24 | 0.63 | 0.63 | 0.63 | 0.24 | 0.63 | 0.24 | W hr L⁻¹ |
| Volume of blowdown H2O + solute + H2O of hydration (if any) | 365 | 325 | 485 | 251 | 342 | 253 | 405 | 290 | L hr⁻¹ |
| Volume of solvent in blowdown | 54 | 192 | 178 | 210 | 210 | 201 | 179 | 210 | |
| Molecular elevation of boiling point (Kb) | 0.512 | 0.830 | 0.512 | 0.512 | 0.512 | 0.830 | 0.512 | 0.830 | |
| Barometric Correction | 0.073 | 0.112 | 0.073 | 0.073 | 0.073 | 0.112 | 0.073 | 0.112 | |
| Elevation of the boiling point | 3.7 | 8.2 | 3.0 | 3.7 | 15.7 | 8.1 | 2.8 | 5.5 | °C |
| Energy required to vaporize liquid in blowdown 25° C | 0.856 | 0.407 | 0.701 | 0.852 | 3.641 | 0.403 | 0.656 | 0.274 | kW h⁻¹ |
| Daily energy spent to vaporize liquid in blowdown@ 25°C | 34.3 | 46.5 | 112.2 | 132.3 | 134.0 | 48.6 | 112.8 | 50.8 | kW h day⁻¹ |
| Power consumption to run pressure pump for Solvent Chamber | 823 | 1115 | 2693 | 3175 | 3217 | 1167 | 2708 | 1218 | kWh day⁻¹ |
| Power consumption to run vacuum pump for solvent recycle | 2.00 | 2.00 | 2.00 | 2.00 | 2.00 | 2.00 | 2.00 | 2.00 | kWh day⁻¹ |
| Total power consumption Internally | 827 | 1119 | 2697 | 3179 | 3221 | 1171 | 2712 | 1222 | kWh day⁻¹ |
| Total power consumption Internally | 0.57 | 0.78 | 1.87 | 2.21 | 2.24 | 0.81 | 1.88 | 0.85 | kW min⁻¹ |
| Temperature in Solvent Chamber at vapor pressure | 22 | 22 | 22 | 22 | 22 | 22 | 22 | 22 | °C |
| Temperature in Blowdown Receiving Chamber | 25 | 25 | 25 | 25 | 25 | 25 | 25 | 25 | °C |
| Temperature in Condenser at 760 mm Hg | 22 | 22 | 22 | 22 | 22 | 22 | 22 | 22 | °C |
| Solvent Chamber operating pressure | 166 | 166 | 166 | 209 | 209 | 166 | 209 | 166 | bar |

FIG. 10A

| FIG. 10A |
| FIG. 10B |

| | | | | | | | | Units |
|---|---|---|---|---|---|---|---|---|
| Solvent Chamber operating chamber | 2400 | 2402 | 2402 | 3025 | 3025 | 2402 | 3025 | 2402 | psi |
| Pressure Chamber operating pressure | 207 | 207 | 207 | 250 | 250 | 207 | 250 | 207 | bar |
| Pressure Chamber operating pressure | 3000 | 3002 | 3002 | 3625 | 3625 | 3002 | 3625 | 3002 | psi |
| Temperature in Pressue Chamber | 22 | 22 | 22 | 22 | 22 | 22 | 22 | 22 | °C |
| Pressure differential across semipermeable membrane (SM) | 41 | 41 | 41 | 41 | 41 | 41 | 41 | 41 | bar |
| Pressure differential across semipermeable membrane (SM) | 600 | 600 | 600 | 600 | 600 | 600 | 600 | 600 | psi |
| Pressure in bladder-type nitrogen pressure buffer tank | 207 | 207 | 207 | 250 | 250 | 207 | 250 | 207 | bar |
| Pressure in bladder-type nitrogen pressure buffer tank | 3000 | 3000 | 3000 | 3625 | 3000 | 3000 | 3625 | 3000 | psi |
| Pressure in Blowdown Reeiving Chamber | 0.04 | 0.27 | 0.04 | 0.04 | 0.04 | 0.27 | 0.04 | 0.27 | bar |
| Flowrate of hydraulic fluid to hydraulic motor | 101 | 90 | 135 | 70 | 95 | 70 | 113 | 81 | mL sec⁻¹ |
| Torque | 216 | 216 | 216 | 261 | 261 | 216 | 261 | 216 | ft.lbs |
| Revolutions per time | 62 | 55 | 82 | 55 | 58 | 42.9 | 69 | 49 | rpm |
| Horsepower, bhp (U.S.) | 2.55 | 2.27 | 3.38 | 2.74 | 2.89 | 1.76 | 3.41 | 2.02 | HP min⁻¹ |
| Horsepower, bhp (U.S.) | 152.81 | 136.16 | 202.89 | 164.44 | 173.10 | 105.81 | 204.81 | 121.39 | HP h⁻¹ |
| Efficiency converting torque to electricity | 0.90 | 0.90 | 0.90 | 0.90 | 0.90 | 0.90 | 0.90 | 0.90 | |
| Kilowatts output (min) | 1.71 | 1.52 | 2.27 | 1.84 | 1.94 | 1.18 | 2.29 | 1.36 | kW min⁻¹ |
| Kilowatts output (hour) | 102.56 | 91.38 | 136.17 | 110.36 | 116.17 | 71.01 | 137.45 | 81.47 | kW h⁻¹ |
| Kilowatts output (day) | 2461 | 2193 | 3268 | 2649 | 2788 | 1704 | 3299 | 1955 | kWh day⁻¹ |
| Net kilowatts output (day) | 1634 | 1074 | 571 | -530 | -433 | 533 | 587 | 733 | kWh day⁻¹ |
| Net kilowatts output (mon) | 49,343 | 32,442 | 17,239 | (16,008) | (13,063) | 16,109 | 17,734 | 22,137 | kWh mon⁻¹ |

| | | | | | | | | |
|---|---|---|---|---|---|---|---|---|
| Electrical consumption (all electric home) | 5000 | 5000 | 5000 | 5000 | 5000 | 5000 | 5000 | 5000 | kWh mon⁻¹ |
| Home serviced | 9.9 | 6.5 | 3.4 | -3.2 | -2.6 | 3.2 | 3.5 | 4.4 | |

FIG. 10B

SYSTEM FOR CONVERTING KINETIC ENERGY FROM BROWNIAN MOTION OF GASES OR LIQUIDS TO USEFUL ENERGY, FORCE AND WORK

This application is a divisional of co-pending U.S. patent application Ser. No. 10/626,209 filed Jul. 24, 2003 and entitled "SYSTEM AND METHOD FOR CONVERTING KINETIC ENERGY OF GASES OR LIQUIDS TO USEFUL ENERGY, FORCE AND WORK" which application is incorporated by reference herein in their entirety.

BACKGROUND

The present invention relates to a system and method for producing energy. More particularly, the present invention relates to a system and method for converting kinetic energy from Brownian motion, through the diffusion of gases or liquids, to useful energy, force and work.

The energy needs of industrially developed countries are supplied primarily by fossil fuels such as petroleum, coal, and natural gas, or by fissionable materials. Global supplies of fossil fuels, as well as nuclear fuels, are necessarily limited, yet it takes natural processes millions of years to create the coal and oil that is consumed in just a few short decades at current levels of global energy use. Furthermore, combustion based energy systems raise particular environmental concerns, such as pollution, and political concerns, relating to the source and availability of the fuel.

As concerns surrounding traditional energy sources persist, and the worldwide rate of energy use increases, the development of alternative forms of energy is becoming increasingly important. It is recognized by those skilled in the art that, in the long term, the energy needs of industrially developed communities will have to be met by alternative energy sources, such as nuclear, and natural gas systems and renewable energy resources such as solar power, wind, hydro power or geothermal power. Currently, power from renewable energy resources is used for specialized purposes at locations remote from a power grid. For example, solar power may be used to operate communication equipment or small water pumps at remote locations. A disadvantage is that solar power is lost at night or reduced by cloud cover. Similarly, availability of wind power is subject to the presence of wind in excess of the minimum velocity required to operate the equipment. These inevitable variations in power level and interruptions in power supply made solar power, and wind power, undesirable as the principal power source for an industrially developed community.

There is a pervasive need for clean, efficient, readily available and renewable energy sources for powering buildings, including homes, motor vehicles, transportation systems, and many commonly used devices. Devices capable of generating electricity by consuming plentiful or renewable supplies of fuels without requiring combustion reduce dependence on these types of energy supplies and methods. It is desirable for an energy source to be nonpolluting, efficient, storable, transportable, clean, plentiful, and readily available from domestic renewable resources.

SUMMARY OF THE INVENTION

The present invention provides a system and method for converting kinetic energy from Brownian motion, through the use of gases or liquids, to useful energy, force and work. An energy generating system of an illustrative embodiment of the invention includes a solvent chamber for holding a solvent solution, a pressure chamber for holding a solute solution, and a semi-permeable barrier separating the solvent chamber from the pressure chamber. The barrier is permeable to solvent molecules and impermeable to solute molecules. Due to a difference in concentration between the solvent and the solute solution, solvent molecules effuse across the semi-permeable barrier into the solute of the closed pressure chamber to increase the pressure of the pressure chamber, thereby generating energy in the form of hydrostatic pressure.

A system for producing energy according to one aspect of one embodiment includes a solvent chamber, a solute chamber and a semi-permeable barrier. The solvent chamber holds a solvent solution. The pressure chamber holds a solute solution. The semi-permeable barrier separates the solvent chamber from the pressure chamber, and is permeable to solvent molecules but impermeable to solute molecules. Thus, solvent molecules effuse across the semi-permeable barrier into the solute solution of the closed pressure chamber to increase the pressure of the pressure chamber, thereby generating energy in the form of hydrostatic pressure. The solute solution can be a saturated solution. The semi-permeable barrier can be a membrane. The semi-permeable barrier can be a gel. The membrane can be contained in a cartridge, wherein the cartridge is open to and contiguous with the solvent chamber. The cartridge can be a reverse osmosis cartridge. According to some aspects, the concentration of the solute solution is maintained at a substantially constant level. According to some aspects, the pressure chamber includes crystals of undissolved solute to maintain said solute solution as a saturated solute solution. The solvent chamber can be either open or closed, for example by one or more valves for opening and closing the solvent chamber. According to further aspects, the system can further include a conversion devices for converting hydrostatic pressure in the pressure chamber to mechanical work. The conversion device can include a first piston in communication with the pressure chamber, wherein the piston moves from a first position to a second position in response to an increase in pressure in the pressure chamber due to the diffusion of solvent molecules into the pressure chamber. The conversion device can further include a diaphragm that separates the pressure chamber from hydraulic fluid in communication with the first piston. The conversion device can further include a push rod connected to the first piston, wherein the push rod moves in response to movement of the first piston. There can also be a mechanical device connected to the push rod, wherein the movement of the push rod is used to operate the mechanical device. The mechanical device can include an alternator, a generator, a gear, a fly wheel, a hydraulic motor and a lever. Various aspects of embodiments include a return system for moving the piston back to the first position. The return system can include a return spring for pushing the push rod. The return system can further include a second system comprising a second solvent chamber, a second pressure chamber, a second semi-permeable barrier separating the second pressure chamber from the second solvent chamber and second piston that moves in response to solvent flow from the second solvent chamber through the semi-permeable barrier into the second pressure chamber, wherein the second piston pushes the first piston back to the first position. In embodiments with a return system, there can be an exhaust system for exhausting solute solution as blow-down when the first piston moves back to the first position. In embodiments with a return system, there can also be a recycling system for recycling solvent after the piston moves back to the first position. The recycling system uses a portion of the energy produced by the system for producing energy. The recycling system can include a blowdown receiving chamber for collecting solute solution expelled through an exhaust channel during backward travel of piston to the first position. The recycling device can further include a heating device connected to the blow-down receiving chamber for vaporizing the solvent in the solute solution into solvent vapor, while retaining solute residue in solid form. The heating device can use heat from a radiant heat source. The heating device can use heat from an electrical heating device. The recycling device further comprises a condenser for receiving the solvent vapor from the blow-down receiving chamber, converting solvent vapor to liquid solvent and returning the liquid solvent to the solvent chamber. The recycling device can further include a vacuum pump for applying a vacuum in the blow-down receiving chamber to lower vapor pressure of solvent in combination with the heating device to facilitate vaporization of the solvent. The recycling system further includes a solute recycling device for returning the solute residue to the pressure chamber after vaporization of the solvent. The blow-down receiving chamber can freeze the solute solution to freeze-dry or concentrate the solute. According to yet further aspects, the buffer chamber can be in communication with the pressure chamber for setting a pressure in the pressure chamber to a desired pressure. The buffer chamber can be filled with compressed gas and includes an elastic diaphragm that separates the solute solution in the pressure chamber and the compressed gas in the buffer chamber. According to yet further aspects of embodiments, there can be a control valve for permitting solvent flow from the solvent chamber, across the membrane and into the pressure chamber. A flow restricting device can control solvent flow from the solvent chamber through the membrane. The solvent can include a water solution, methanol, liquid bromine and mixtures thereof. The solute can include any one or more of NaCl, $AlCl_3$, LiCl, solvent-soluble acids, bases, metal salts of inorganic acids, metal salts of organic acids; chlorides, sulfates, nitrates, sugars, colloidal osmotic agents, inorganic or organic polymers, sugars, alcohols and mixtures thereof. The cartridge can be located in the interior of the pressure chamber. The cartridge can include two layers of membrane separated by a separator to form a sack. The system can include a plurality of pistons. The system can also include a plurality of membrane cartridges. Aspects of embodiments can also include various combinations of the individual aspects of embodiments described.

According to other aspects of embodiments, a method of producing energy can include providing a system for generating energy comprising a solvent chamber, a pressure chamber and a semi-permeable barrier separating the solvent chamber from the pressure chamber; filling the solvent chamber with a solvent; filling the pressure chamber with a solute solution comprising a solute and solvent; flowing solvent from the solvent chamber to the membrane, such that solvent molecules effuse across the semi-permeable membrane into the solute solution, thereby increasing the pressure in the pressure chamber; and converting the increased pressure in the pressure chamber to energy. The method can further include exhausting solute solution from the pressure chamber. The method can also further include recycling solute solution after exhausting the solute solution from the pressure chamber. The method can also include recycling comprising separating solute molecules from solvent molecules in the solute solution. Separating the solute molecules from solvent molecules can include vaporizing the solvent. The method including separating can also include condensing the vaporized solvent to liquid solvent. After condensing, the method can include returning the liquid solvent to the solvent chamber. Finally, the solute molecules can be returned to the pressure chamber.

According to yet other aspects of embodiments, a method for producing and maintaining a steady-state, high pressure can include providing a system for generating energy comprising a solvent chamber, a pressure chamber and a semi-permeable barrier separating the solvent chamber from the pressure chamber; filling the solvent chamber with a solvent; filling the pressure chamber with a solute solution; and flowing solvent from the solvent chamber to the membrane, such that solvent molecules effuse across the semi-permeable membrane into the solute solution, thereby increasing the pressure in the pressure chamber. This method can include pressurizing the solvent chamber. Pressurizing the solvent chamber can include using an external pressure pump in communication with the solvent chamber. Any of the foregoing methods can further include converting the pressure increase in the pressure chamber to energy. When using an external pressure pump, the external pressure pump can be powered using a portion of the energy generating by converting the pressure increase in the pressure chamber.

According to yet a further aspect of embodiments, a method for producing a vacuum can include providing a device comprising a closed solvent chamber, an open pressure chamber and a semi-permeable barrier separating the solvent chamber from the pressure chamber; filling the solvent chamber with a solvent; filling the pressure chamber with a solute solution; flowing solvent from the solvent chamber to the membrane, such that solvent molecules effuse across the semi-permeable membrane into the solute solution, thereby leaving a void in the solvent chamber. The method can further include exhausting the solute solution from the pressure chamber. The method can also include controlling the flow of solvent from the solvent chamber.

According to further aspects of embodiments, there is provided a membrane cartridge for separating a pressure chamber from a solvent chamber in a system for producing energy. The cartridge includes a first layer, a second layer and a support. The first layer includes a material through which solvent molecules can pass, while preventing passage of solute molecules. The second layer includes a material through which solvent molecules can pass, while preventing passage of solute molecules, wherein the second layer is connected to the first layer to form a sack having a pocket. The support can be disposed within the pocket of the sack. The first layer and second layer can be joined, such that the sack is closed on three sides and open on a fourth side. The membrane cartridge can include a perforated tube attached to the fourth side of the sack. The membrane cartridge can include one or more o-rings for sealing the perforated tube to the solvent chamber. The membrane cartridge can be configured to be placed in the interior of the pressure chamber and in communication with the solvent chamber. Finally, the membrane cartridge can include a second perforated tube connected to another side of the sac.

BRIEF DESCRIPTION OF THE FIGURES

In the Figures, in which like reference designation indicate like elements:

FIG. 2b illustrates a reverse osmosis cartridge suitable for implementation in the energy generating system of FIG. 2a;

FIG. 5 illustrates an embodiment of a recycling system of the system of FIG. 2a;

FIGS. 10 A and B is a table of calculated energy balances.

DETAILED DESCRIPTION OF THE INVENTION

Figure 1:
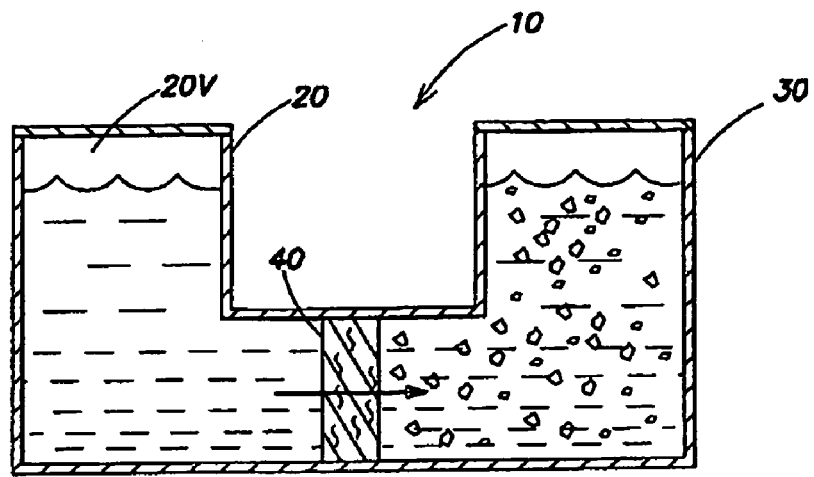
FIG. 1 is a block diagram of an energy generating system according to an illustrative embodiment of the invention.

The present invention provides an improved system and method for producing energy. The present invention provides an efficient, low-cost energy generating system that utilizes renewable energy sources. The invention will be described below relative to illustrative embodiments. Those skilled in the art will appreciate that the present invention may be implemented in a number of different applications and embodiments and is not specifically limited in its application to the particular embodiments depicted herein.

The Source of Energy

In liquid and gas systems, molecules are in constant motion—Brownian motion. Such motion is directly related to the ambient temperature, i.e., the higher the temperature the greater the kinetic energy in the molecular motion. In the absence of other changes, for example, a doubling of the temperature in a system increases the kinetic energy of Brownian motion two fold. As with other liquid or gaseous systems, Brownian motion occurs in the chambers of the invention apparatus and the collective kinetic energy in such chambers is directly related to ambient temperature. The heat from the surrounding environment (ultimately from the sun) provides the energy for Brownian motion of solvent molecules that effuse through the solvent-permeable barrier into the solute solution, i.e., from a zone of high solvent concentration to a zone of lower solvent concentration. The energy that drives the invention system is, therefore, the energy from the sun.

Osmosis occurs when a semi-permeable barrier separates two fluids having different concentrations, for example, two solutions having different salinities. As used herein, the term "osmosis" refers to the tendency of solvent molecules to move down a solvent concentration gradient from high solvent concentration across a semi-permeable barrier into a low solvent concentration. As used herein, the terms "solvent" and "solvent solution" refer to a liquid substance that can dissolve or is miscible with another substance. As used herein the term "solute" refers to a substance that can be dissolved in or by or is miscible with a solvent. As used herein, miscible substances are those which are soluble in each other, i.e., any quantity of one substance is soluble in any quantity of the other. For the purposes of this discussion the miscible "solvent" molecule can pass through the membrane, whereas, the soluble "solute" molecule cannot. As used herein, the term "solute solution" refers to a solution comprising a solvent and solute. As used herein, the term "semi-permeable barrier" refers to a porous, hydrophobic, hydrophilic, or electrically charged barrier consisting of organic or inorganic materials through which solvent molecules can pass but solute molecules cannot. As used herein, the term "semi-permeable membrane" refers to a porous membrane made from organic or inorganic materials through which solvent molecules can pass but solute molecules cannot primarily determined by molecular size. The semi-permeable barrier or membrane can comprise a gel matrix or macroporous ion exchange beads for immobilizing or trapping solute molecules while allowing passage of solvent molecules. An example of osmosis is the tendency of water to pass from a zone of low solute concentration through a semi-permeable membrane, such as the cytoplasmic membrane of a living cell, into a zone of high solute concentration.

To achieve equilibrium, liquid flows through the semi-permeable barrier into the solution having a higher concentration until the pressure on the high concentration side of the membrane reaches or exceeds the osmotic pressure. As used herein, the term "osmotic pressure" refers to a point at which a hydrostatic pressure brought on by the net unidirectional movement of solvent molecules across a semi-permeable membrane into a chamber of solute is sufficiently high to prevent further movement of the solvent across the semi-permeable membrane. The term "osmotic pressure" also refers to a pressure that applied to the system produces a hydrostatic pressure sufficiently high to prevent further movement of solvent across the semi-permeable membrane. The application of a pressure equal to or greater than the osmotic pressure on a side of a semi-permeable barrier including the higher concentration solution stops the flow of liquid from a second side having a lower concentration, across the semi-permeable barrier into the first side. Therefore, in order to stop the net flow of water from solvent to solute side of a semi-permeable barrier, i.e., to bring the net flow of water across the semi-permeable barrier to zero, the pressure applied to the solute side of the semi-permeable barrier is equal and opposite to that exerted by the diffusion of the solvent down the solvent concentration gradient. The osmotic pressure of a solution is estimated by the van't Hoff equation. The term "van't Hoff equation" refers to the following equation $\pi = cRT$, where: $\pi$=osmotic pressure; c=sum of molar concentrations of all ions; R=gas constant=0.082; T=absolute temperature.

The diffusion or effusion of the solvent molecules, such as water, toward an even distribution on both sides of a semi-permeable barrier over time due to osmosis can produce a pressure of substantial proportions. As used herein, the term "diffusion" refers to the tendency of species of gas or liquid molecules to move from an area of high concentration into an area of low concentration tending toward an even distribution of molecules. As used herein, the term "effusion" refers to the movement of molecules across a semi-permeable membrane or barrier. For example, just to prevent the passage of fresh water (the solvent) in the "wrong" direction through a reverse osmosis membrane into sea water, one must apply a pressure of approximately 28 bar on the sea water side of the semi-permeable barrier. (One bar equals a pressure of 1 Kg/cm$^2$ and pressure of 1 atmosphere.) The force of 28 bar does not produce fresh water but merely brings the net flow to zero, i.e., the flow in one direction equals that in the other. In order to force the water through the membrane leaving the salts of sea water behind, the applied pressure must exceed 28 bar (406 psi). In practice, a pressure of 35 to 55 bar (508-798 psi) is typically applied in a reverse osmosis (RO) process. The term "reverse osmosis" refers to a process in which a pressure greater than the osmotic pressure of a solute solution is applied to reverse the net unidirectional movement of solvent through a semi-permeable membrane against a solvent concentration gradient; a process used in the production of fresh water from seawater.

FIG. 1 illustrates an energy generating system 10 for generating energy according to an illustrative embodiment of the present invention. The system 10 comprises a solvent chamber 20 for holding a solvent solution, and a pressure chamber 30 for holding a solute solution. A semi-permeable barrier 40, such as a semi-permeable membrane, separates the solvent chamber 20 from the pressure chamber 30. The illustrative barrier 40 is permeable to solvent molecules, such as water molecules and other small solvents, and impermeable to solute molecules, such as NaCl, to allow the flow of solvent molecules across the barrier while blocking solute molecules from passing through the barrier. According to the illustrative embodiment, the solvent solution in the solvent chamber 20 and the solute solution in the pressure chamber 30 have different concentrations. The difference in concentration between the solvent solution and the solute solution results in the effusion of the solvent molecules from the solvent chamber 20 across the semi-permeable barrier 40 into the solute solution of the pressure chamber 30. When the pressure chamber 30 is closed, the net unidirectional solvent flow from the solvent chamber 20 into the pressure chamber 30 progressively increases the kinetic energy in the pressure chamber 30, i.e., produces an increase in hydrostatic pressure. The pressure in the pressure chamber progressively rises until the hydrostatic pressure becomes sufficient, i.e., equal to or greater than the osmotic pressure, to stop the net unidirectional flow of solvent across the semi-permeable barrier 40 into the pressure chamber 30.

One skilled in the art will recognize that the pressure chamber, solvent chamber, and semi-permeable barrier may have any suitable structure, size or configuration.

The solvent used in the illustrative energy generating system 10 may comprise any suitable liquid or gas for dissolving a substance. Suitable solvents include, but are not limited to: water, aqueous solutions, organic solvents such as methanol and methanol solutions, inorganic solvents including liquid Bromine, gases, liquid gases and combinations thereof. The solute may comprise any suitable substance that will not cross a semi-permeable barrier, but which will form a solution with the solvent. The solute used in the illustrative energy generating system 10 may comprise any suitable substance that may be combined with a solvent to form a solute solution. Suitable solutes include, but are not limited to Aluminum Chloride ($AlCl_3$), Sucrose, NaCl, LiCl, Iron Chloride ($FeCl_3$), solvent-soluble acids, bases, metal salts of inorganic acids, metal salts of organic acids, chlorides, sulfates, nitrates, sugars, colloidal osmotic agents, inorganic or organic polymers, sugars and alcohols. The solute is preferably soluble in or miscible with the solvent; e.g., methanol, a small molecular weight organic molecule, and a larger chain alcohol, such as octanol or benzoic acid, can be employed as solute and solvent because methanol is miscible with either organic molecule mentioned. Any suitable substance may be used as a solvent or solute, provided the integrity of the semi-permeable barrier to solute or miscible substance is maintained, i.e., solvent molecules can pass through the semi-permeable barrier but solute molecules cannot.

The solvent or solute may also comprise a gas, may also be used in the gaseous or liquid form, provided one gas molecule can pass through the semi-permeable barrier, whereas the other cannot for whatever reason. Suitable gases include, but are not limited to: Carbon dioxide, nitrogen, helium and argon, gaseous organic molecules (e.g., methane, ethane, propane, butane), or gaseous inorganic molecules (e.g., oxygen, chlorine, fluorine, carbon dioxide, nitrogen, helium, argon). Further, the state of such molecules, i.e., gaseous or liquid, can depend on the temperature and/or the pressure.

The solute and/or solvent may also comprise two organic molecules, where one molecule is small enough to pass through the selected semi-permeable barrier and act as a solvent for the second organic molecule. Alternatively, the two molecules are miscible, and the second molecule has a size to prevent penetration of the membrane. For example, a semi-permeable barrier in an energy generating system is selected to permit the ready passage of an electrically neutral organic molecule (used as a solvent) into the pressure chamber, while preventing a second molecule from passage by means of an electrical charge on the barrier. Alternatively, the solvent and the barrier can be selected to be hydrophobic in nature, while the solute has sufficient electrical charge to preclude its passage through the semi-permeable barrier.

According to the illustrative embodiment, the solute solution in the pressure chamber is a saturated solute solution, to ensure a constant difference in the concentration between the solvent solution and the solute solution. The pressure chamber may include solid pellets or crystals of a solute to maintain the solute solution in a saturated state. One skilled in the art will recognize that the solvent and solute solution may have any concentration, as long as the concentration of the solvent in the solute solution is different from and lower than concentration of solvent in solvent chamber.

The diffusion of solvent molecules from the solvent chamber 20 into the pressure chamber 30 is governed by the principles of osmosis. For example, if molecules of a solute in solution, e.g., Aluminum Chloride, $AlCl_3$, are introduced in high concentration at a point in a body of solvent, e.g., water, the molecules will disassociate into ions. Each molecule of aluminum salts disassociates into four ions: one positively charged $Al^{+++}$, and the other three negatively charge $Cl^{-}$. The dissociated $Al^{+++}$ and $Cl^{-}$ ions will disperse by Brownian motion throughout the solvent until the distribution of the ions is uniform throughout the body of solvent. Further, when $AlCl_3$ is added to water, the total volume of the liquid will increase directly with the amount of salt added since two molecules cannot occupy the same space at the same time. The aluminum salt continues to go into solution until a point of saturation is reached, beyond which additional salt will not go into solution unless physical conditions change. The concentration of aluminum chloride in water at saturation is 699 $g\,L^{-1}$ at 15.degree. C. or in molar concentration 5.25 M. The total ion concentration at that saturation point is $5.25 \times 4 = 21.0$ M. Dividing the weight of the dissolved salt by its density (699 $g\,L^{-1}$ ÷ 2.44 $g\,ml^{-1}$ = 286 ml of salt per liter of solution) gives the volume occupied by the salt in the solution.

Therefore, in a saturated salt solution of 1000 mL, the space occupied by the salt is 286 mL and that by the water is 1000 ml−286 ml or 714 ml $L^{-1}$. The concentration of pure water is 1000 g $L^{-1}$ ÷ 18 g $mol^{-1}$ = 55.56 mol $L^{-1}$ or 55.56 molar $H_2O$. In the given example of saturated $AlCL_3$ in water, where the salt occupies 286 mL, the concentration of water decreases 28% from 55.56 M to 39.67M. If a semi-permeable membrane or other semi-permeable barrier separates a pure water solution from a saturated aluminum chloride solution in water, there exists 55.56 M $H_2O$ on a first side (pure water) and 39.67M $H_2O$ on the other side (saturated aluminum chloride solution). Water molecules effuse through the semi-permeable membrane pores in both directions but the net unidirectional flow of water is from the higher water concentration into the lower, i.e., water flows down a concentration gradient tending toward a uniform concentration on both sides of the semi-permeable membrane. If a semi-permeable membrane-divided chamber containing a saturated solution of $AlCl_3$ is an open chamber, the incoming water molecules progressively increase the volume of the solution and concomitantly dilute the solute concentration proportionately. The water does not reach, but only approaches, a uniform concentration on both sides of the semi-permeable membrane and the solute on one side cannot cross the semi-permeable membrane. Therefore, the net unidirectional movement of water continues from high water concentration to low until the head pressure in the solute side of the semi-permeable barrier is sufficient to bring the rate of molecular water effusion in both directions to equilibrium, i.e., the height of the water on the solute side is sufficient to stop the net flow of water in one direction.

One could apply the Van't Hoff equation to a solution of concentrated $AlCl_3$ to estimate the potential pressure that can be obtained in a pressure chamber assuming the maintenance of the semi-permeable barrier integrity and 100% efficiency of the semi-permeable barrier to exclude solute molecules.

$$\pi = (5.25 \text{ mol } AlCl_3 * 4 \text{ ions/ml NaCl})$$
$$*0.082*300=517 \text{ bar}$$

517 Kg $(cm^2)^{-1}$ * 14.2 $lbs/in^2$ = 7354 psi. Further, higher pressures are possible using $AlCl_3$ as the solute and methanol as the solvent. $AlCl_3$ will dissolve in methanol (12.5° C.) at 1000 g $L^{-1}$ of methanolic solution. According to the Van't Hoff equation, the osmotic pressure of a saturated methanolic solution of $AlCl_3$ is $$1000 \text{ g } AlCl_3 \text{ } L^{-1} \text{ solution}/133.34 \text{ g mol}^{-1}$$
$$1*4 \text{ moles ions mol}^{-1}$$
$$AlCl_3*0.082*300=738 \text{ bar}$$

$$738 \text{ bar}*14.2 \text{ psi bar}^{-1}=10,479 \text{ psi}.$$

For LiCl, also soluble in methanol, 424 g LiCl $L^{-1}$ methanol at 35° C. has a calculated osmotic pressure potential of $$428 \text{ g}/42.39 \text{ g mol}^{-1}*2 \text{ mol ions/mol [LiCl]}$$
$$*0.082*300=497 \text{ bar}(7057 \text{ psi}).$$

The comparable osmotic pressures for saturated LiCl in water is 1030 bar.

$$888 \text{ g LiCl L-1H}_2\text{O}(36° \text{ C.})/42.39*2*0.082*300=1030 \text{ bar}(14,626 \text{ psi}).$$

The solvent flowrate into the pressure chamber 30 from the solvent chamber 20 depends on several factors. For example, the solvent flow rate may vary with the (i) surface area of the semi-permeable barrier 40; (ii) the pore size in the semi-permeable barrier 40; (iii) the sum of open pore area in the semi-permeable barrier 40; (iv) the temperature (molecular activity: Brownian motion); (v) the pressure applied to the solvent chamber 20 or other factors. The flowrate of solvent also varies inversely with (vi) the viscosity of the solvent; (vii) the hydrostatic pressure in the pressure chamber 30, and (viii) the surface tension of the solvent at the semi-permeable barrier 40.

With the progressive movement of solvent across the semi-permeable barrier 40, the volume of liquid in the pressure chamber 30 tends to increase as a result of pressure chamber 30 expansion. The pressure chamber 30 and/or the solvent chamber 20 of the illustrative generator 10 may be open or closed using valves or other suitable means.

In a closed pressure chamber 30 containing a concentrated solute and excess solute crystals, the addition of solvent molecules from the solvent chamber does not change the solute concentration, since the solute is maintained as a solute-saturated solution by virtue of the progressive dissolution of solute crystals in the incoming solvent. As a result, a steady-state, high pressure within the pressure chamber 30 can be attained and maintained.

According to one embodiment, the energy generating system 10 may be used to produce and maintain a vacuum within a closed solvent chamber 20. To produce and maintain a vacuum, the solvent chamber 20 is preferably closed, has a defined volume, and contains a volume of solvent at the start of operation. The crossing of the solvent across the semi-permeable barrier 40 into the pressure chamber 30 due to osmosis causes a progressively decreasing pressure (vacuum) in the progressively enlarging void space 20v above the solvent in the solvent chamber 20. In a vacuum-generating mode, the pressure chamber 30 is preferably open, though one skilled in the art will recognize that the pressure chamber may also be closed when producing a vacuum in the solvent chamber. Despite the vacuum that develops, the net unidirectional flow of solvent molecules across the semi-permeable barrier 40 continues until the solvent chamber 20 is empty or the vapor pressure of the solvent is reached at which point the solvent will boil. The fact that the solvent boils does not prevent the ongoing passage of solvent molecules across the semi-permeable barrier 40 into the open pressure chamber 30.

The generator 10 may also include an external vacuum pump (not shown) in communication with the solvent chamber 20 for producing a vacuum above the solvent in the solvent chamber 20.

Figure 2A:
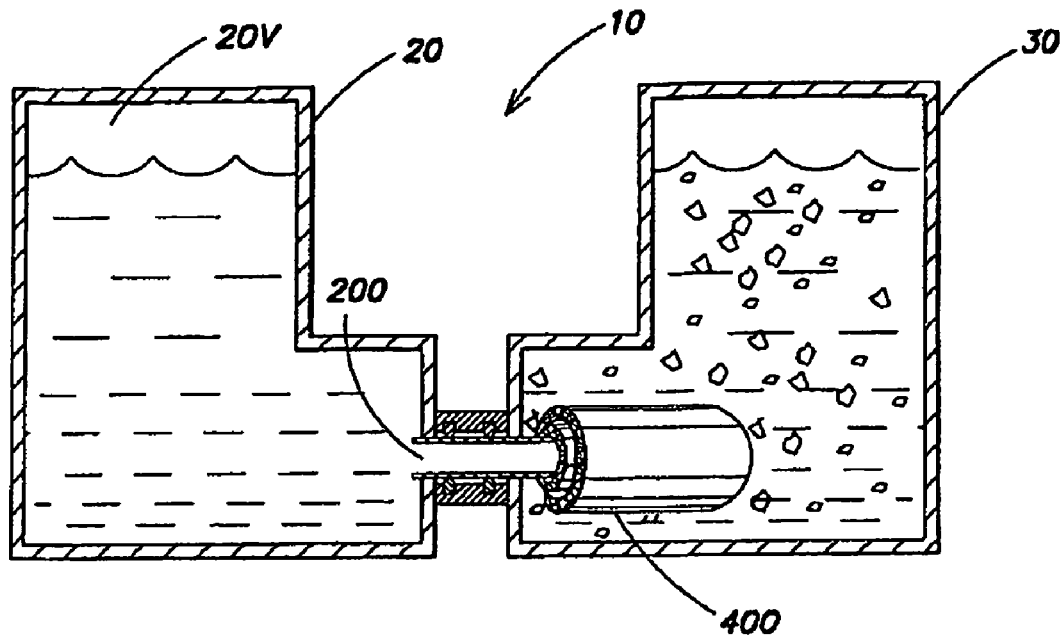
FIG. 2a illustrates an energy generating system including a reverse osmosis cartridge according to another embodiment of the invention.

In another embodiment, shown in FIG. 2a, the semi-permeable barrier 40 of the energy generating system 10 comprises a membrane cartridge 400, such as a reverse osmosis cartridge, disposed inside the pressure chamber 30. The cartridge 400 comprises a semi-permeable membrane mounted on a support having an interior. The interior of the membrane cartridge 400 is in fluid communication with the solvent chamber and the exterior of the cartridge contacts the solute solution. The volume of solvent chamber 20 includes the interior of cartridge 400. The membrane cartridge 400 may have any suitable size and configuration depending on the application. The membrane cartridge 400 may comprise a commercially available semi-permeable membrane cartridge, such as the Dow Filmtec RO membrane, though one skilled in the art will recognize that the invention is not limited to the described embodiment.

Figure 2B:
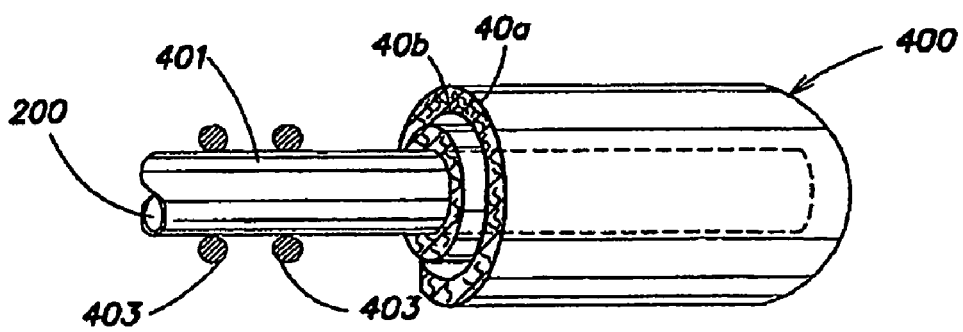

The configuration of a reverse osmosis membrane cartridge suitable for use in the energy generating system 10 is shown in FIG. 2b. The illustrative membrane cartridge is impermeable to solutes of a selected molecular size, permeable to solvents, and constructed with a relatively large surface area that will withstand high pressure on the solute side of the membrane.

In any configuration, the solvent chamber 20 is directly connected to the semi-permeable barrier. For example, the solvent chamber may be in communication with an opening to a reverse osmosis cartridge 400 disposed between the solvent chamber 20 and the pressure chamber 30. Even though the semi-permeable membrane, shown coiled in FIG. 2b, forms an integral portion of the solvent chamber 20, it is preferably located inside the pressure chamber 30. The semi-permeable cartridge can take many forms but preferentially consists of two membrane layers 40a, 40b, separated by a fine, filamentous, net-like, inert separator/support. The separator supports the membrane layers under pressure and protects the membrane layers from damage due to the pressure differential between the pressure chamber and the solvent chamber. The membrane layers are joined and sealed in such a way as to form a sac with the inert separator attached or loose on the inside of the sac. In one embodiment, the semi-permeable sac is closed on three sides and open on the fourth. The open fourth side is fastened to and sealed onto a perforated tube 401. In the illustrative embodiment, the solvent flow from the solvent chamber, through a solvent channel 200, which connects the pressure chamber 30 to the solvent chamber 20, and into the tube 401. The solvent passes through the tube 401 and into the sac before defusing through the membrane layers. The cartridge is sealed to the solvent chamber using a suitable seal, such as o-rings 403 disposed about the end of the tube 401 to seal the tube end within the solvent channel 200, as shown in FIGS. 2a and 2b. Such cartridges can be of various sizes depending on the application, and similar or identical to those used for desalination of sea water, tap water, industrial waste water, or contaminated environmental waters. Dialysis membranes with larger pore sizes can also be used, as can other semi-permeable membranes appropriate for retaining a solute while allowing solvent molecules to pass through.

According to another embodiment, the cartridge 400 may include a second perforated tube attached and sealed to the opposite end of the membrane sac. The membrane sac may be wrapped around and fastened to the perforated tubes at opposite ends by any suitable means. The use of a second perforated tube allows for periodic or continuous solute washout of the solvent chamber side of the semi-permeable membrane cartridge 400 to prevent the accumulation of solute molecules for any reason in the solvent chamber 20. One skilled in the art will recognize that any suitable device or process that prevents the concentration buildup of solute molecules is included as an embodiment of the invention. For example, a pulse of solvent can be passed through the entire inside of the cartridge semi-permeable membrane chamber washing out any solute molecules that may have accumulated. As a result of the solute washout, the net unidirectional flow of solvent molecules across the semi-permeable membrane is maximized.

According to another embodiment, the semi-permeable barrier comprises a gel matrix or macroporous ion exchange beads for immobilizing or trapping the solute molecules, while allowing passage of solvent molecules.

To operate the system 10, the solvent chamber 20 is filled with a solvent. The solvent chamber 20 borders on at least a portion of one side by a semi-permeable barrier 40. The semi-permeable barrier may comprise a membrane in the form of a cartridge identical to or similar to that used in reverse osmosis, though one skilled in the art will recognize that the invention is not limited to the described configuration. A miscible substance or a saturated solution of a solute is used to fill the pressure chamber 30. The pressure chamber 30 preferably includes solute crystals for maintaining the solute solution in a saturated state. As soon as the solvent chamber 20 and pressure chamber 30 are filled, the solvent will diffuse across the semi-permeable barrier 40 from the solvent chamber 20 into the pressure chamber 30 in a net unidirectional flow.

During operation, the pressure in the pressure chamber 30 can be hundreds of times greater than that in the solvent chamber 20 or hundreds of time higher than atmospheric pressure. The pressure differential between the pressure chamber 30 and the solvent chamber 20 is distributed directly across the semi-permeable barrier 40.

Figure 3:
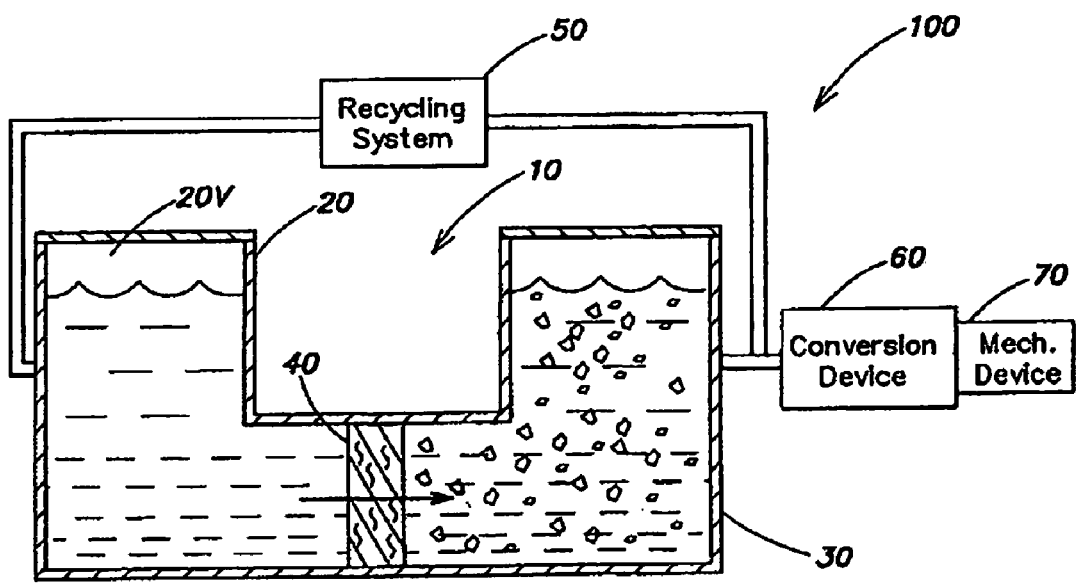
FIG. 3 is a block diagram of a power supply system including the energy generating system of FIG. 1 according to an illustrative embodiment of the invention.

As shown in FIG. 3, the illustrative energy generating system 10 may be implemented in a power supply system 100 for powering a mechanical device 70. As shown, the power supply system 100 includes a conversion device 60 for converting a hydrostatic pressure in the pressure chamber to mechanical work for driving the mechanical device 70. As used herein, the term "work" refers to force multiplied by the displacement in the direction of the force (kg·meter). The illustrative power supply system 100 may also include a recycling system 50 for recycling the molecular substances used for the production of energy back to the solvent chamber 20 for re-use. According to one aspect, the recycling system is powered using a portion of the energy produced by the system 10.

Figure 4:
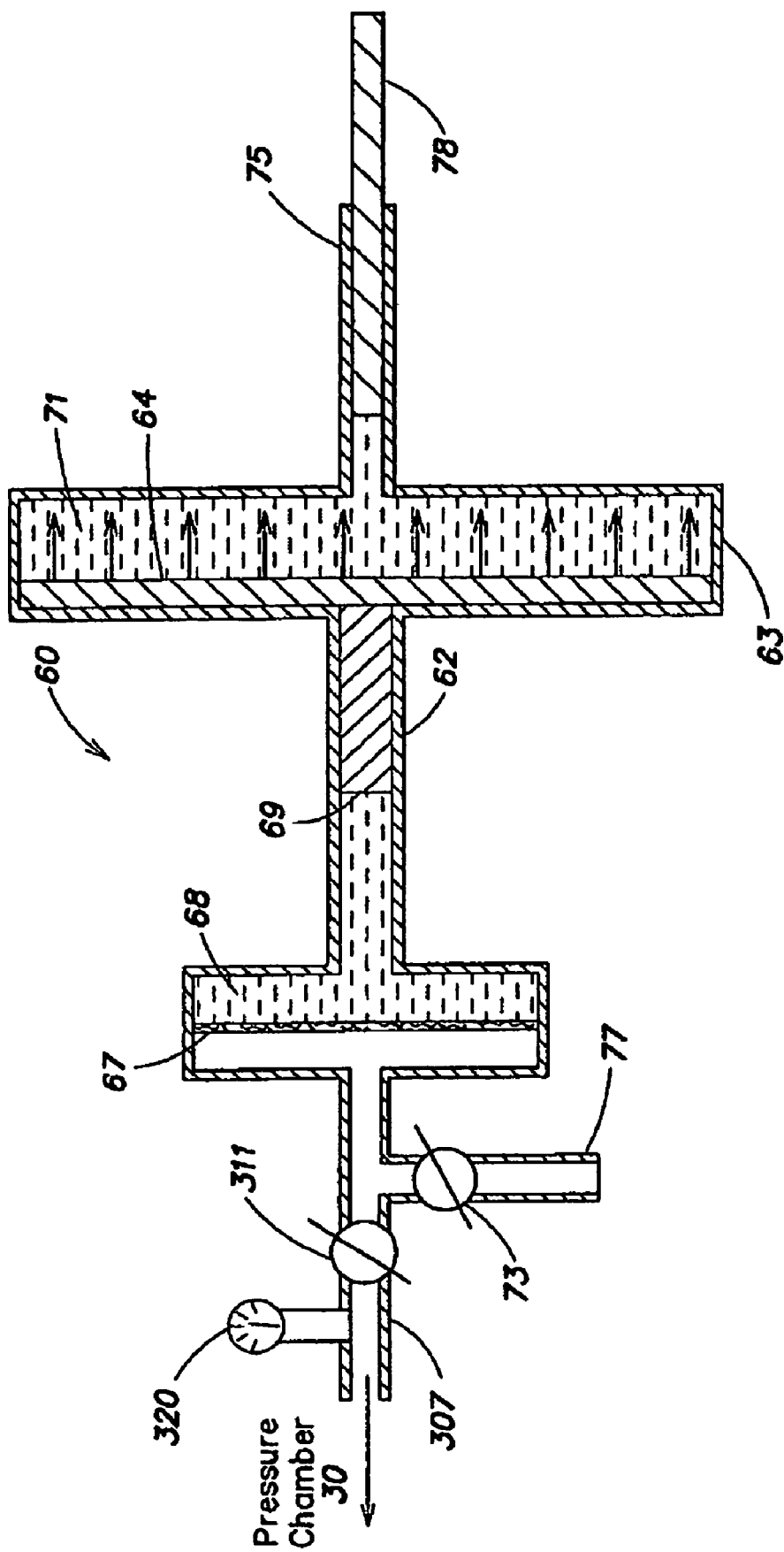
FIG. 4 illustrates an embodiment of the conversion device of the system of FIG. 5.

FIG. 4 illustrates an embodiment of a conversion device 60 suitable for converting an increase in pressure in a pressure chamber 30 due to the influx of solvent molecules from the solvent chamber into mechanical work. As shown, the conversion device 60 includes a flexible diaphragm 67 in fluid communication with the pressure chamber for absorbing pressure changes in the pressure chamber 30. A connecting valve 311 in a connecting channel 307 controls the flow of fluid from the pressure chamber to the diaphragm. The pressure increases in the pressure chamber due to the diffusion of solvent through the semi-permeable barrier exerts pressure on the diaphragm 67. The diaphragm 67 separates the pressure chamber from hydraulic fluid 68, which is connected to a first piston 69 in a first cylinder 62. In response to deflection of the diaphragm 67 due to an increase in pressure in the pressure chamber 30, the hydraulic fluid 68 pushes the first piston 69 forward, which in turn moves a second, larger piston 64 in a second cylinder 63. The larger surface area of the second piston 64 forces the hydraulic fluid 71 into a third cylinder 75 having a smaller diameter. The third cylinder 75 in turn drives a push rod 78 forward. The push rod 78 moves faster relative to the first piston 69. After the push rod 78 moves fully forward, due to the increased pressure in the pressure chamber 30, the push rod 78 reciprocates back to a starting position.

Any number of mechanical devices 70 connected to the push rod 78 can be driven directly or indirectly by the system. For example, the mechanical device 70 may comprise an alternator, a generator, a gear, a fly wheel, a hydraulic motor, a lever or any other device capable of being driven by a reciprocating push rod.

The conversion device 60 may also include an exhaust channel 77 in communication with the connecting channel 307 for exhausting used solvent and solute solution from the system, and an exhaust valve 73 for controlling the flow of fluid through the exhaust channel. After the push rod 78 moves fully in the forward direction, the connecting valve 311 between the conversion device and the pressure chamber closes and the exhaust valve 73 opens to allow fluid flow through the exhaust channel. A return spring, or other suitable device, reverses the direction of the push rod 78 to the starting position. Upon the opening of the exhaust valve 73, there is little or no resistance to the return of the push rod 78 since the pressure goes to one atmosphere. The first piston 69, the second piston 64 and the diaphragm 67 return to their respective starting positions, at which time the exhaust valve 73 closes. The return movement causes the solvent solution filling the connecting channel to drain into the exhaust channel 77.

According to another embodiment, the device for returning the push rod 78 back to the starting position may comprise a second power supply system operating in conjunction with the first power supply system. The first and second power supply system preferably operate in an alternating manner, such that the push rod of the second power supply system pushes the push rod of the first power supply system back to the starting position by moving in the forward direction, and vice versa.

The volume in the pressure chamber 30 remains substantially constant within small variation since a substantially equal volume of solvent entering the chamber 30 during the cycle is expelled as blowdown through the exhaust channel 77.

The rate of solvent flow across the semi-permeable barrier 40 can vary slightly relative to the volume of the blowdown 77 in an instance where a single piston is operated from pressure chamber 30. In this instance, the blowdown volume will be equal to that of the hydraulic fluid 68 displaced to move the first piston 69 forward plus the volume of solvent that enters the pressure chamber 30 during the return of the first piston 69 to its starting position.

Figure 5:
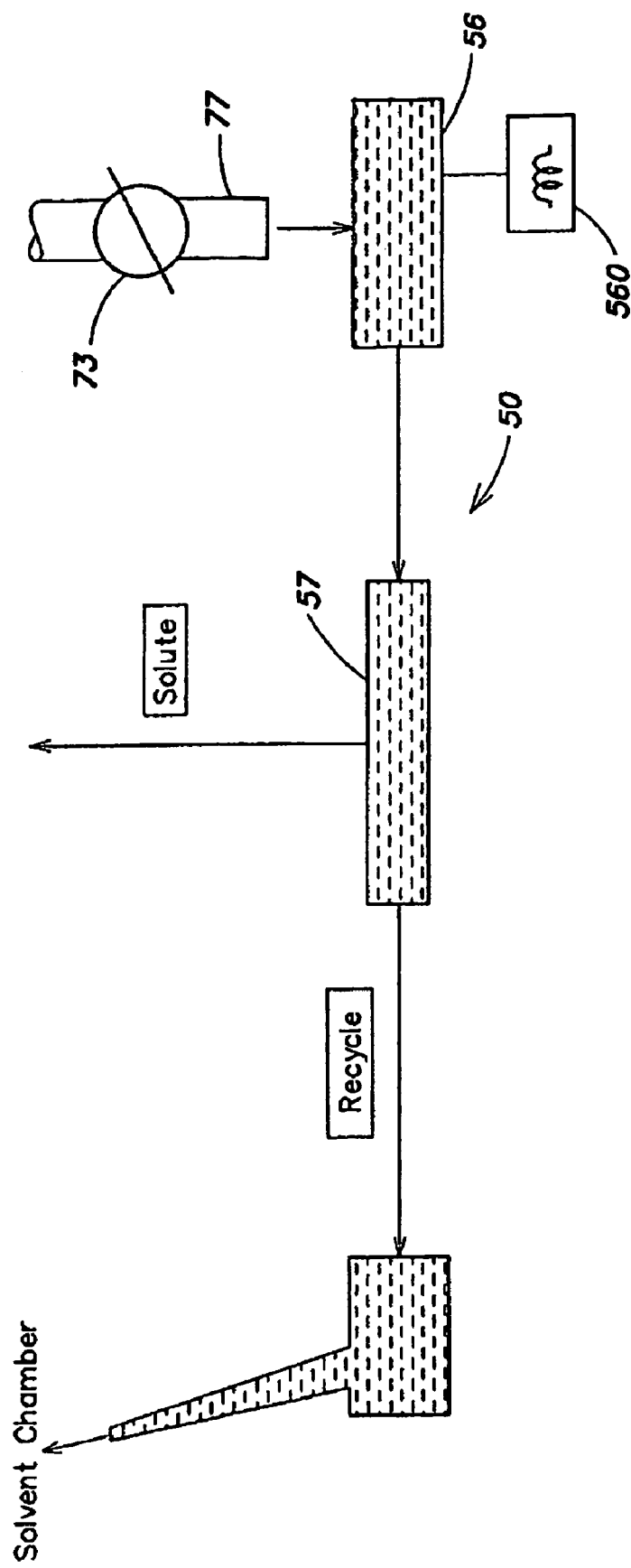

FIG. 5 illustrates an embodiment of a recycling system 50 for recycling solvent and solute solutions, which may be connected to the exhaust channel 77. The illustrative recycling system 50 includes a blowdown receiving chamber 56 for receiving the exhausted solute and solvent. The blowdown receiving chamber 56 vaporizes the solvent in the exhausted solute solution. One skilled in the art will recognize that any suitable means, such as heating, may be used to vaporize the solvent. Preferably, the blowdown receiving chamber 56 dries the solute in the exhausted solute solution to a dry form and then introduces the dried solute back into the pressure chamber 30 at designated intervals by any appropriate transfer means. After vaporization, the vaporized solvent passes into a joined condenser 57, which condenses the vaporized solvent from the vapor state to a liquid state. The liquid solvent then circulates to the solvent chamber 20, where the energy producing process repeats using the recycled solvent and solute.

In the illustrated configuration, the blowdown receiving chamber 56, the condenser 57 and the solvent chamber 20 are hermetically joined and the internal space throughout is under vacuum at or near the vapor pressure of the solvent. The maintenance of the temperature inside the solvent chamber 20 and the condenser at or below the vapor pressure point of the solvent at a given low pressure (i.e., vacuum) promotes vaporization of the solvent, as well as transformation of the vapor into a liquid in the condenser 57 and preservation of a liquid state in the solvent chamber 20. For example, lowering the pressure over the solvent in the solute solution exhausted from the exhaust channel and into the blowdown receiving chamber 56 lowers the boiling point of the solvent, allowing vaporization to occur at a lower temperature, which thereby conserves energy.

As an example, the vaporization point of water at 760 mm (1 atmosphere) of mercury (Hg) is 100.degree. C., whereas water vaporizes at 51.degree. C. at 100 mm Hg. Another example is the solvent methanol, a solvent in which $FeCl_3$, LiCl, and $AlCl_3$ are highly soluble, vaporizes at 64.5.degree. C. at 760 mm Hg; however, at 100 mm Hg methanol vaporizes at a temperature of 21.degree. C. Isopropanol is an example of a solute that has a lower boiling point than the solvent $H_2O$. The power required to vaporize such solvents or solutes can come from a portion of the energy generated by an alternator(s) or generator(s) powered by the energy generating system 10.

The vacuum may be induced or maintained in the solvent chamber 20, blowdown receiving chamber 56 and the condenser 57 by diffusion of solvent molecules from the solvent chamber 20 into the pressure chamber 30 leaving a void, as described above. According to a preferred embodiment, the low pressure (vacuum) over the solvent in the solvent chamber 20 is maintained constant within a small range by selectively opening and closing the solvent chamber for appropriate time intervals. One skilled in the art will recognize that an external or bolt-on vacuum pump may also be used to achieve and/or maintain a vacuum.

During the return of the first piston 69 of the conversion device 60 to the starting position, the blowdown solvent/solute volume is pushed through the exhaust channel 77, past the exhaust valve 73 and into the blowdown receiving chamber 56. After the blowdown receiving chamber 56 fills, the exhaust valve 73 closes and a valve between the blowdown receiving chamber and the solvent condenser opens to pass the solvent vapors to the condenser 57. The blowdown receiving chamber may include heating coil 560 for heating the solvent/solute solution. To initiate vaporization, a switch is turned ON, causing current to flow through heating coil, which heats and vaporizes the solvent. The condenser 57, also under the same vacuum as the blowdown receiving chamber 56, is maintained at a lower temperature than the blowdown receiving chamber 56, which is preferably a temperature lower than the solvent vapor pressure point, to transform the solvent vapor into a liquid. After condensation, the liquid solvent flows, for example, by gravity, from the condenser 57 into the solvent chamber 20.

According to another embodiment, the solute may be separated from the solvent in the solute solution by freeze-drying or concentrating the solute by freezing to exclude solute molecules from the solvent.

One skilled in the art will recognize that the recycling system 50, i.e., the blowdown receiving chamber 56, the condenser 57 and associated channels, need not be attached to the system 10, but may exist as a separate and/or disconnected system. One skilled in the art will also recognize that the recycling system 50 is not limited to the illustrated embodiment and that the recycling system may have any suitable size, configuration, number and type of components for exhausting used solute solution from the pressure chamber 30.

The illustrative power-generating system 100 may be operated in a number of operational modes. The various operational modes described below can each be viewed in isolation, although actual operation of the system may employ a plurality or all of the "operational modes" simultaneously. As described above, the system may be used to produce pressure or vacuum through the flow of solvent across the semi-permeable barrier. Alternatively, the system 100 may be rapidly brought to pressure or vacuum with bolt-on pumps that operate from a portion of the power generated by the invention apparatus, itself, or by a battery integral to the apparatus. The illustrative power-generating system may be operated in one of four modes: (i) pressure only; (ii) vacuum only; (iii) pressure/vacuum, and/or pressure/pressure.

Figure 6:
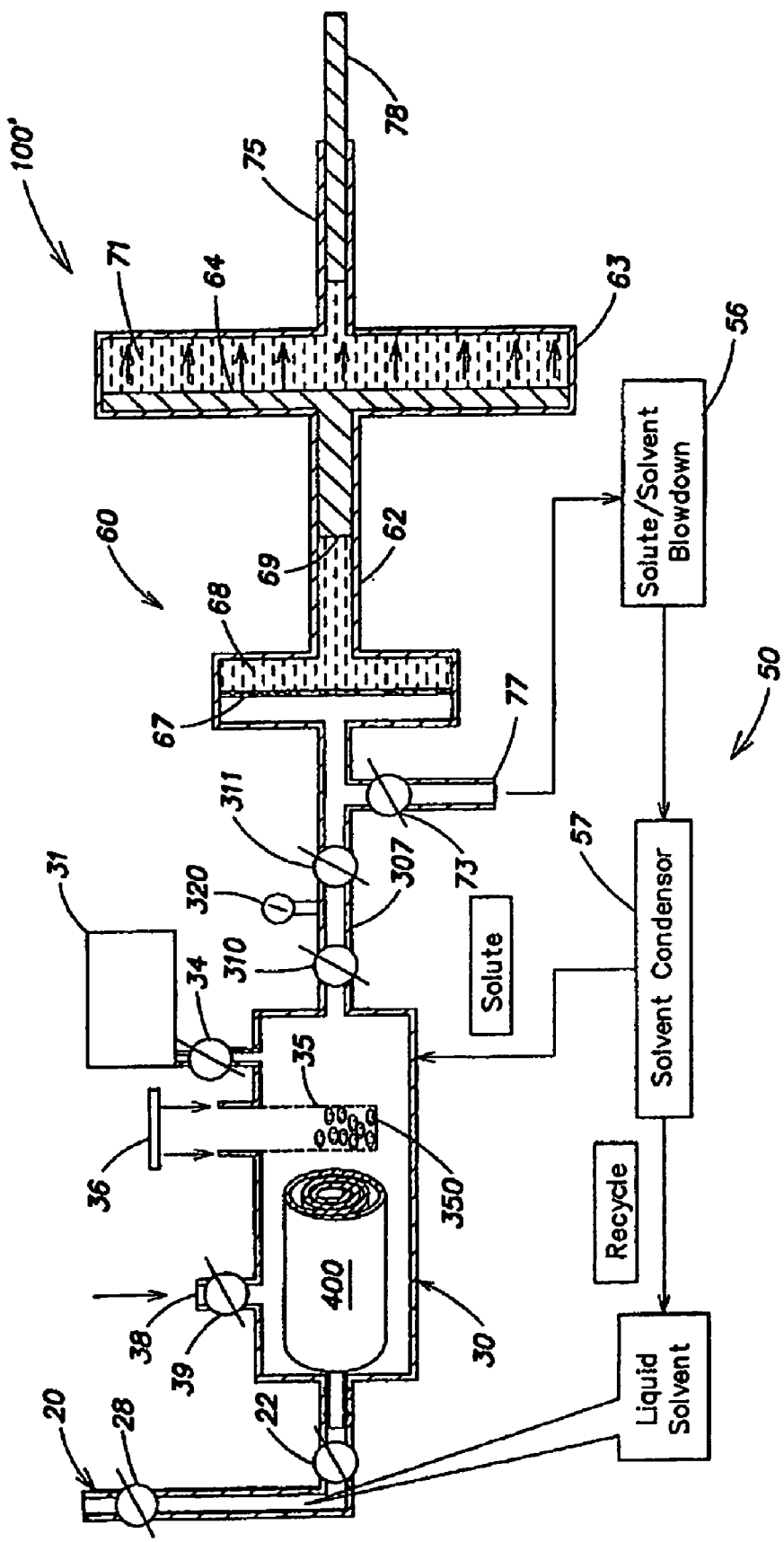
FIG. 6 illustrates a power supply system according to another embodiment of the invention.

FIG. 6 illustrates a power supply system according to another embodiment of the invention. As shown, the power-supply system 100' includes an energy generating system 10, comprising a solvent chamber 20, a semi-permeable barrier 40, which is in the form of a membrane cartridge 400, and a pressure chamber 30. The power-supply system 100' also includes a recycling system, such as the recycling system 50 of FIG. 5, and a conversion device, such as the conversion device 60 of FIG. 4.

The illustrative power supply system 100' includes a flow restricting device, such as valve 22 for controlling the flow of liquid solvent from the solvent chamber to the pressure chamber. According to one embodiment, the valve 22 comprises a needle valve for selectively restricting or blocking the flow of solvent from the solvent chamber 20 through the pores of the semi-permeable barrier 40 and into the pressure chamber 30.

The system 100' also includes a solvent chamber valve 28 for selectively opening and closing the solvent chamber 20. When the solvent chamber valve 28 is open, the solvent chamber pressure is atmospheric. When the solvent chamber valve 28 is closed, the solvent chamber is sealed.

The pressure chamber 30 of the power supply system 100' further includes a filling port 38 for filling the pressure chamber with a solvent or solute solution. The illustrative solvent filling port 38 includes a solvent filling valve 39 for selectively opening and closing the solvent filling port. The pressure chamber also includes a solute chamber 35 for holding a supply of solid solute pellets or crystals 350 for maintaining the solute solution in a saturated state. The solute chamber includes a filling port 36 for providing access to the solute chamber 35. The solute chamber 35 is permeable to dissolved solute molecules and solvent molecules, but impermeable to the solid solute particles, so that the solute may continually dissolve into the solute solution.

The system 100' further includes a buffer tank 31 in communication with the pressure chamber 30 for setting the pressure within the pressure chamber 30. The buffer tank includes a buffer tank valve 34 for selectively allowing communication between the buffer tank and the pressure chamber. The buffer tank 31 is filled with compressed gas, such as nitrogen, and may include an elastic buffer diaphragm for separating the solute solution in the pressure chamber from the compressed gas in the buffer tank.

The pressure chamber 30 may further include a pressure gauge 320, which may be located in the connecting channel 307, or any suitable location.

In the pressure only mode, i.e., without an accompanying vacuum in the solvent chamber 20, the valves 28, 22 and 310 are open. The valves 311, 34 and 310 may selectively open and close as needed. Valves 39 and filling port 36 are closed to provide a sealed pressure chamber 30. There may be a limited expansion of the pressure chamber 30, as well as a limited compressibility, which serve as significant factors in the fast pressure rise in the pressure chamber 30, in addition to the flow rate of solvent across the semi-permeable barrier 40.

In the vacuum only mode, a vacuum gauge or automatic pressure transducer device may be placed in, on or above a vacuum chamber located above the valve 28 to close and seal the solvent chamber 20 to the outside. During the vacuum only mode, the valves 22, exhaust valve 73 and connector valves 310, 311 are open. Valves 39 and filling port 36 in pressure chamber are closed. The diffusion of solvent from the solvent chamber 20 through the semi-permeable barrier 40 into the pressure chamber 30 produces a progressively increasing void in the closed solvent chamber 20. The solvent input into the pressure chamber 30 results in overflow through the exhaust valve 73. In the vacuum only mode, high vacuums may be achieved, or maintained.

In a vacuum and pressure mode, a mode in which a vacuum in the solvent chamber 20 can be developed simultaneously with a pressure increase in the pressure chamber 30, or either or both, can be produced by the system. During a vacuum and pressure mode valves 22, 310 and 311 are open, while valves 28 and 39 and filling port 36 are closed. If very high vacuums are desirable along with high pressure, the vacuum in the solvent chamber 20 can be developed first, as described above. After the desired vacuum is reached, the pressure chamber is closed and sealed to convert the solvent flow into a pressure increase. The pressure within the pressure chamber rises, while the vacuum in the solvent chamber 20 is maintained by the continuous movement of the solvent across the semi-permeable barrier 40. As in other modes of operation, adequate solvent must be present in the solvent chamber 20 to carry out the desired work on a continuous basis.

In a pressure/pressure mode, pressures to about 3000 psi or higher may be achieved in the pressure chamber. High pressures may be achieved by pressurizing the solvent chamber 20 to a pressure less than that in the pressure chamber 30, but sufficiently high to maintain a pressure differential that will maintain the semi-permeable membrane integrity and permit operation to about 3000 psi or higher. The higher pressure introduced into the solvent chamber 20 indicates the higher kinetic activity [Brownian motion] among solvent molecules, which in turn translates to an increased net unidirectional flowrate of solvent across the semi-permeable barrier 40. The higher the molecular activity in the solvent chamber 20, the faster the flow of solvent molecules across the semi-permeable barrier 40. The pressurization of the solvent chamber also preserves the semi-permeable barrier. For example, commercial semi-permeable reverse osmosis membranes are rated for operational pressure differential across the membrane of 1000 psi. When such membranes are employed in the energy generating system 10 of the present invention, the operational pressure in the pressure chamber may exceed the published operational specifications of the semi-permeable membrane. By pressurizing the solvent chamber, the 1000 psi operational pressure differential across the semi-permeable membrane recommended by the manufacture can be maintained and still operate the system at 2000 to 3000 psi in the pressure chamber 30.

In a continuous mode, the system carries out work continuously. The pressure in the pressure chamber and the vacuum in the solvent chamber are maintained by the continuous movement of solvent across the semi-permeable barrier and the return of solvent by means of the recycling system 50 to the solvent chamber 20. During the continuous operation mode, valves may open and close as required at appropriate times to actuate moving parts or processes within the apparatus or to convey the energy required to operate attached mechanical or hydraulic equipment 70. In one operational protocol, the pressure in the pressure chamber 30 increases or decreases in response to the load required to perform a given work by any device 70 attached to the system. For example, in instances where the pressure chamber fluid is in direct contact with a piston or push rod 78 that, in turn, is putting force onto a device, e.g., a crankshaft, the piston will move forward faster when a low force (the load) is required to move the crankshaft. When the load on the crankshaft is high, the kinetic energy (pressure) required to move the piston forward will be greater and the pressure in the pressure chamber 30 will build up as a consequence of the continuous inflow of solvent into the pressure chamber 30. When more force is required to do work, more time is generally required to develop the necessary pressure in the pressure chamber 30. Therefore, in the illustrative example, work requiring more force will generally be accomplished more slowly, not unlike the operation of a steam engine. Conversely, work requiring less force will be carried out faster, and require less pressure.

In a continuous mode of operation, the buffer tank 31 may advantageously prevent wide pressure swings in the pressure chamber 30 during operation of devices 70 connected to the energy generator and to prevent hydrostatic locks that could damage the system through over pressure. The buffer tank 31 can be brought to the desired pressure by the actuation of a bolt-on pressure pump with valve 34 in the closed position before starting operation of the system. Alternatively, the buffer tank 31 may be left at the desired pressure by closing the valve 34 at the end of an operation. With the buffer tank 31 pre-charged, the opening of valve 34 instantly brings the pressure chamber 30 at or near the desired pressure. One skilled in the art will recognize that the described method of bringing the pressure tank to a desired pressure is not necessary to operate the system.

For example, in another embodiment, the energy generating system 10, itself, can bring the buffer tank 31 to the desired pressure without requiring an outside or bolt-on gas pump. With the buffer tank 31 connected to the pressure chamber 30, it is possible to operate the system at a relatively constant pressure by the application of a connected gear box, which provides a means for operations over relatively wide range of forces and speeds.

Figure 7:
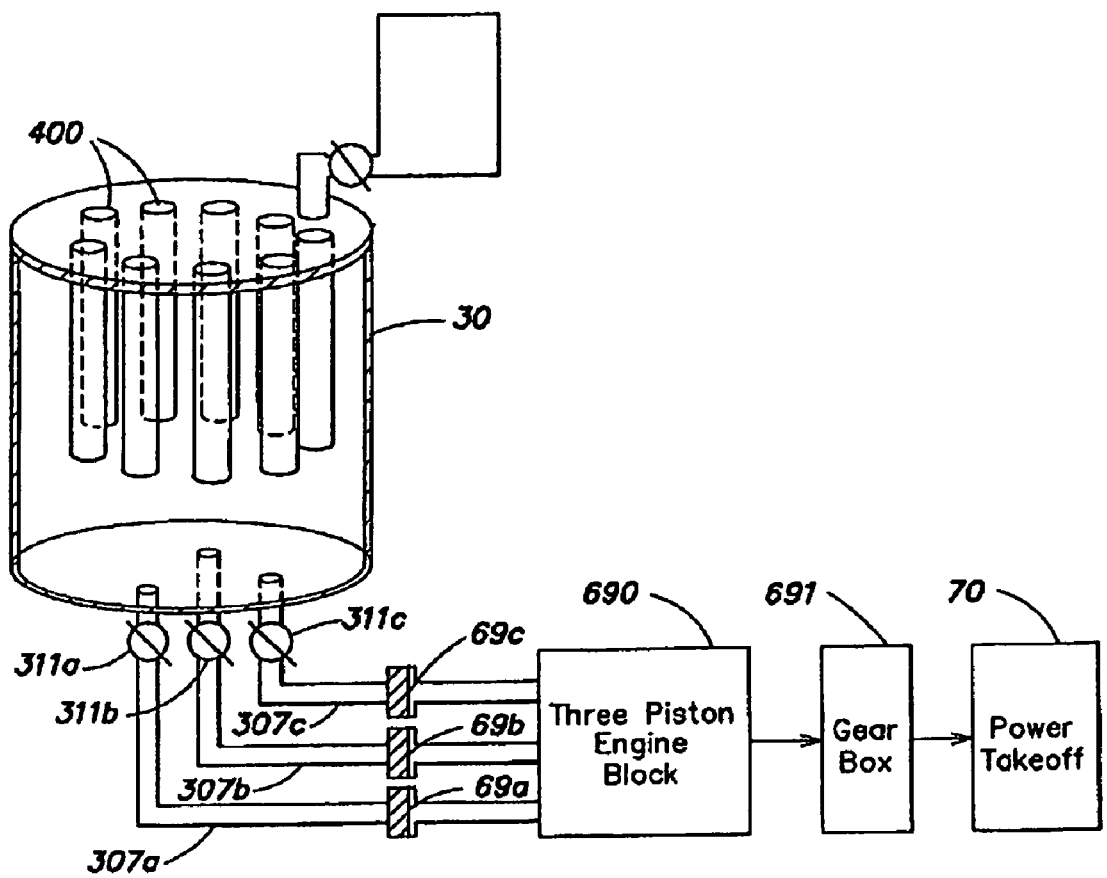
FIG. 7 illustrates a power supply system including a plurality of pistons, and semi-permeable membrane cartridges according to another embodiment of the invention.

According to another embodiment, the power-generating system may include a plurality of hydraulic pistons 69a, 69b, 69c, as shown in FIG. 7 in communication with the pressure chamber 30. The pistons 69a, 69b, 69c, operated from the pressure chamber 30, move forward and backward in conjunction with the synchronized opening and closing of flow-control valves 311a, 311b, 311c in connecting channels 307a, 307b, 307c, respectively. An external electronic controller (not shown) selectively opens and closes the flow-control valves. The illustrative hydraulic pistons 69a, 69b, 69c drive a three-piston engine block 690, which is connected to a gear box 691 used to power a device 70. FIG. 7 shows multiple pistons operated in parallel from a single pressure chamber, though one skilled in the art will recognize that the invention is not limited to the illustrated configuration and that any suitable number of pistons can be operated from a pressure chamber 30.

Figure 8:
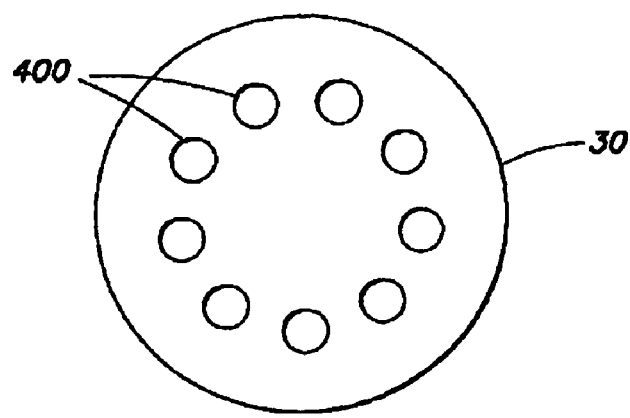
FIG. 8 is a side view of the pressure chamber of the power supply system FIG. 7.

As shown in FIGS. 7 and 8, the energy generating system 10 may comprise any number of semi-permeable cartridges 400 of any appropriate size, or other devices that constitute barriers to the passage of solute but not solvent, in one or more pressure chamber(s) 30. The use of multiple semi-permeable barriers increases the flow rate of solvent into the pressure chamber in proportion to the total active surface area of semi-permeable membrane or other said barrier.

Figure 9:
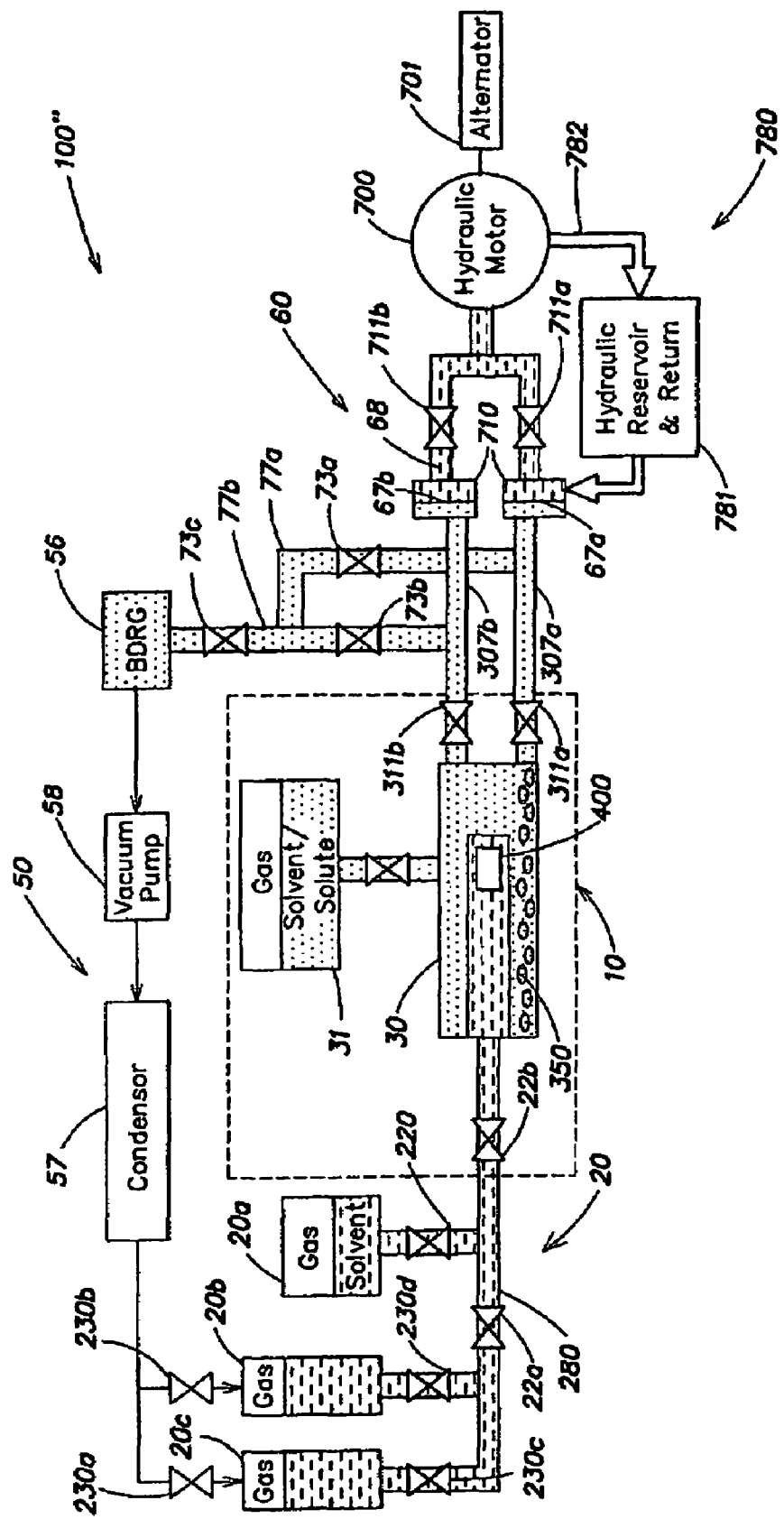
FIG. 9 illustrates a power supply system according to another embodiment of the invention.

FIG. 9 illustrates another embodiment of a power-generating system 100" implementing an energy generating system 10 of the illustrative embodiment of the present invention. In the embodiment of FIG. 9, the solvent chamber 20 comprises a primary solvent chamber 20a, as well as secondary solvent chamber 20b, 20c, which receive recycled liquid solvent from a condenser 57 in a recycling system 50 and pass the recycled solvent to the primary solvent chamber 20a or the pressure chamber 30 as needed. The system 100" includes secondary solvent valves 230a, 230b, 230c, 230d, for controlling liquid flow into and out of the secondary solvent chambers 20b and 20c, respectively. The system 100" further includes a solvent channel 280 connecting the solvent chambers 20a, 20b, 20c and the pressure chamber 30. The solvent channel 280 includes first and second valves 22a, 22b for controlling the flow of liquid solvent through the solvent channel 280, as well as a solvent chamber valve 220 for controlling the flow of liquid solvent from the primary solvent chamber 20a. Each of the solvent chambers 20a, 20b and 20c is pressurized by a gas, so that as solvent flows across the semi-permeable membrane of cartridge 400, a substantially constant pressure differential is maintained across the membrane.

The conversion device 60 of the power-generating system 100" includes two parallel connecting channels 307a, 307b, including valves 311a, 311b, respectively. The conversion device includes parallel diaphragms 67a, 67b separating the channels 307a, 307b, respectively, from hydraulic fluid 68 in hydraulic cylinders 710, which transmits impulses to drive a hydraulic motor 700 in response to pressure increases in the pressure chamber 30. As shown, the channels include valves 711a, 711b for selectively blocking transmission of hydraulic impulses from the diaphragms, 67a, 67b, respectively. In the illustrative embodiment, the hydraulic motor 700 drives an alternator 701, though one skilled in the art will recognize that the invention is not limited to the illustrated configuration. The conversion device further includes a hydraulic fluid recycling system 780 for recycling hydraulic fluid used to drive the hydraulic motor. As shown, the hydraulic fluid recycling system 780 includes a hydraulic reservoir 781 and a hydraulic channel 782 in communication with the hydraulic motor 700 and the cylinders 710 containing the hydraulic fluid 68.

In the embodiment of FIG. 9, the flow rate of the hydraulic fluid displaced by a diaphragm in response to a pressure increase in the pressure chamber 30 determines the speed (RPM) of the hydraulic motor 700 and hence the speed (RPM) of the alternator. The torque of the hydraulic motor depends on the pressure in the pressure chamber 30 and the flow rate of the blowdown solute/solvent solution through the exhaust channels.

As shown, the recycling system 50 of the power-generating system 100" includes a first exhaust channel 77a for connecting the first connecting channel 307a with the blowdown receiving chamber 56, and a second exhaust channel 77b for connecting the second connecting channel 307b with the blowdown receiving chamber 56. A plurality of exhaust valves 73a, 73b, 73c selectively block flow through the first exhaust channel 77a, the second exhaust channel 77b and into the blowdown receiving chamber 56, respectively. One skilled in the art will recognize that the recycling system is not limited to the illustrated embodiment.

As shown, the recycling system may also include a vacuum pump 58 between the blowdown receiving chamber 56 and the condenser 57 for promoting and enhancing the recycling process.

Exemplification of the Invention

FIG. 10 shows an example energy balance of a power supply system using methanol or water as a solvent and various chloride salts as solutes according to an illustrative embodiment. In the example, the system is operated at an ambient temperature of about 22.degree. C. FIG. 10 compares an energy output for a system using different solutes and solvents. FIG. 10 illustrates various chloride salts, including $AlCl_3.6H_2O$, $AlCl_3$, Sucrose, NaCl, LiCl, $FeCl_3.6H_2O$ and $FeCl_3$, their relative solubilities in water and methanol and the concentrations of methanol and water without the inclusion of salts. One skilled in the art will recognize that the solvent is not limited to methanol or water, but can be chosen from any number of solvent molecules provided each can pass through a selected semi-permeable barrier. The solute may also comprise any suitable species that cannot pass through the selected semi-permeable barrier and are either soluble in or miscible with the solvent.

As shown in FIG. 10, a power-supply system operating with $AlCl_3$ as a solute and water as a solvent may be capable of generating up to about 50,000 kilowatt-hours per month, after accounting for the power required to operate the system. The 50,000 kilowatt-hour net output is capable of providing the electricity needs of almost ten homes, each consuming 5,000 kilowatt-hours per month, while utilizing a portion of the power generated to operate the system.

The present invention provides significant advantages over prior systems and method for producing energy and/or a vacuum. The present invention provides a system and method for efficiently transforming kinetic energy from Brownian motion, through the diffusion of solvent or gas molecules, into mechanical work. Locally, the system consumes neither fuel nor any other form of generated energy, instead extracting ambient heat energy (ultimately from the sun) from the Brownian motion of the working materials. No chemical reactions occur inside or outside the system. There are no particulate, gas or heat emissions. The commercially available substances used in the system undergo no molecular change or transformation. The molecular substances used for the production of energy are recycled repeatedly and indefinitely by the consumption of a small portion of the energy produced from the system itself. The rationale for the production of energy is based upon well known physical principles. All components used in the construction of the system are commercially available off-the-shelf items and are relatively inexpensive. The system can be scaled from small portable units to large stationary ones. The operational parameters for the system can be adjusted or manipulated to suit a wide variety of applications. The kinetic energy produced by the apparatus is readily converted to mechanical, hydraulic or electrical energy.

One skilled in the art will recognize that FIGS. 1-9 are schematic representations of illustrative embodiments, and that the illustrated systems are not limited to the illustrative embodiments. The system and method for producing a vacuum, energy and/or work according the teachings of the invention may have any suitable configuration.

The present invention has been described relative to an illustrative embodiment. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

What is claimed:

1. A system for producing energy, comprising:
   a solvent chamber for holding a solvent solution;
   a pressure chamber for holding a solute solution;
   a semi-permeable barrier separating said solvent chamber from said pressure chamber, wherein said barrier is permeable to solvent molecules and impermeable to solute molecules, wherein solvent molecules effuse across said semi-permeable barrier into the solute solution of said pressure chamber when said pressure chamber is closed to increase the pressure of said pressure chamber, thereby generating energy in the form of hydrostatic pressure;
   one or more valves for opening and closing said pressure chamber;
   a conversion device coupled to said pressure chamber via said one or more valves for converting hydrostatic pressure in said pressure chamber to mechanical work, said conversion device including a member in communication with said pressure chamber, wherein said member moves from a first position to a second position in response to an increase in pressure in said pressure chamber due to the diffusion of solvent molecules into said pressure chamber, said conversion device further including a diaphragm that separates said pressure chamber from hydraulic fluid in communication with said member;
   a return system for moving said member back to said first position; and
   a recycling system for recycling solvent after said member moves back to said first position, said recycling system including a blow-down receiving chamber for collecting solute solution expelled through an exhaust channel coupled to said one or more valves wherein said solute solution is expelled during the travel of said member to said first position, a heating device connected to said blow-down receiving chamber for vaporizing the solvent in the solute solution into solvent vapor.

2. The system of claim 1, wherein the solute solution is a saturated solution.

3. The system of claim 1, wherein said semi-permeable barrier is a membrane.

4. The system of claim 1, wherein said semi-permeable barrier is a gel.

5. The system of claim 3, further comprising a housing containing said membrane, wherein said housing is open to and contiguous with said solvent chamber.

6. The system of claim 5, wherein said housing comprises a reverse osmosis housing.

7. The system of claim 1, wherein the concentration of the solute solution is maintained at a substantially constant level.

8. The system of claim 1, wherein said pressure chamber includes crystals of undissolved solute to maintain said solute solution as a saturated solute solution.

9. The system of claim 1, wherein said solvent chamber connects to at least one valve in order to open and close said solvent chamber.

10. The system of claim 1, wherein said member comprises a piston and said conversion device further comprises a push rod connected to said piston, wherein said push rod moves in response to movement of said piston.

11. The system of claim 10, further comprising a device connected to said push rod, wherein the movement of said push rod is used to operate said device.

12. The system of claim 11, wherein said device comprises an alternator, a generator, a gear, a fly wheel, a hydraulic motor and a lever.

13. The system of claim 11, wherein said device comprises a generator.

14. The system of claim 11, wherein said device comprises a gear.

15. The system of claim 11, wherein said device comprises a fly wheel.

16. The system of claim 11, wherein said device comprises a hydraulic motor.

17. The system of claim 11, wherein said device comprises a lever.

18. The system of claim 1, wherein said return system comprises a mechanism for applying a force to said push rod.

19. The system of claim 18, wherein said mechanism for applying a force to said push rod is a spring.

20. The system of claim 1, wherein said return system comprises a another solvent chamber, a another pressure chamber, a another semi-permeable barrier separating said other pressure chamber from said another solvent chamber and another member that moves in response to solvent flow from said another solvent chamber through said semi-permeable barrier into said another pressure chamber, wherein said another member pushes said member back to said first position.

21. The system of claim 1, wherein said heating device comprises a radiant heat source.

22. The system of claim 1, wherein said heating device comprises an electrical heating device.

23. The system of claim 1, wherein said recycling device further comprises a condenser for receiving the solvent vapor from said blow-down receiving chamber, converting solvent vapor to liquid solvent and returning the liquid solvent to said solvent chamber.

24. The system of claim 23, wherein said recycling device further comprises a vacuum pump for applying a vacuum in said solvent chamber to lower vapor pressure of solvent in combination with said heating device to facilitate vaporization of the solvent.

25. The system of claim 1, wherein said blow-down receiving chamber freezes the solute solution to freeze-dry or concentrate the solute.

26. The system of claim 1, further comprising a buffer chamber in communication with said pressure chamber for setting a pressure in said pressure chamber to a desired pressure.

27. The system of claim 26, wherein said buffer chamber is in communication with a compressed gas source in order to permit compressed gas into said buffer chamber and wherein said buffer chamber is filled with compressed gas and further includes an elastic member that separates the solute solution in said pressure chamber and the compressed gas in said buffer chamber.

28. The system of claim 1, further comprising a control valve for permitting solvent flow from said solvent chamber, across said semi-permeable barrier and into said pressure chamber.

29. The system of claim 1, further comprising a flow restricting device for controlling solvent flow from said solvent chamber through said semi-permeable barrier.

30. The system of claim 1, wherein the solvent solution comprises a water solution, methanol, liquid bromine or mixtures thereof.

31. The system of claim of claim 1, wherein the solute solution comprises NaCl, $AlCl_3$, LiCl, solvent-soluble acids, bases, metal salts of inorganic acids, metal salts of organic acids; chlorides, sulfates, nitrates, sugars, colloidal osmotic agents, inorganic or organic polymers, sugars, alcohols or mixtures thereof.

32. The system of claim 5, wherein said housing is located in said interior of said pressure chamber.

33. The system of claim 5, wherein said housing comprises two layers of membrane separated by a separator.

34. The system of claim 1, further comprising a plurality of members.

35. The system of claim 5, further comprising a plurality of membrane housings each containing a membrane.

* * * * *